(12) United States Patent
Sarna et al.

(10) Patent No.: US 10,853,987 B2
(45) Date of Patent: *Dec. 1, 2020

(54) GENERATING CARTOON IMAGES FROM PHOTOS

(71) Applicant: Google LLC, Mountain View, CA (US)

(72) Inventors: Aaron Sarna, London (GB); Dilip Krishnan, Arlington, MA (US); Forrester Cole, Mountain View, CA (US); Inbar Mosseri, Raanana (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,440

(22) Filed: Dec. 3, 2019

(65) Prior Publication Data

US 2020/0175740 A1 Jun. 4, 2020

Related U.S. Application Data

(63) Continuation of application No. 15/921,207, filed on Mar. 14, 2018, now Pat. No. 10,529,115.

(60) Provisional application No. 62/473,783, filed on Mar. 20, 2017.

(51) Int. Cl.
*G06T 13/80* (2011.01)

(52) U.S. Cl.
CPC .................. *G06T 13/80* (2013.01)

(58) Field of Classification Search
CPC .......... G06T 13/00–80; G06K 9/00221–00315
See application file for complete search history.

(56) References Cited

U.S. PATENT DOCUMENTS

| 5,963,217 A | 10/1999 | Grayson et al. |
| 2007/0242856 A1 | 10/2007 | Suzuki et al. |
| 2011/0064388 A1 | 3/2011 | Brown et al. |
| 2014/0078144 A1 | 3/2014 | Berriman et al. |
| 2016/0344668 A1 | 11/2016 | Young et al. |
| 2017/0069124 A1 | 3/2017 | Tong et al. |

OTHER PUBLICATIONS

Chalas, et al., "Generating various composite human faces from real 3D facial images", the Virtual Computer 33.4, published online Jun. 14, 2016, 2017, pp. 443-458.
USPTO, Non-final Office Action for U.S. Appl. No. 15/921,207, dated Feb. 1, 2019, 18 pages.
USPTO, Final Office Action for U.S. Appl. No. 15/921,207, dated Jun. 19, 2019, 24 pages.
USPTO, Notice of Allowance for U.S. Appl. No. 15/921,207, dated Sep. 19, 2019, 5 pages.

*Primary Examiner* — Daniel F Hajnik
(74) *Attorney, Agent, or Firm* — IP Spring

(57) ABSTRACT

A system and method for generating cartoon images from photos are described. The method includes receiving an image of a user, determining a template for a cartoon avatar, determining an attribute needed for the template, processing the image with a classifier trained for classifying the attribute included in the image, determining a label generated by the classifier for the attribute, determining a cartoon asset for the attribute based on the label, and rendering the cartoon avatar personifying the user using the cartoon asset.

20 Claims, 13 Drawing Sheets

GENERATING CARTOON IMAGES FROM PHOTOS

CROSS REFERENCE TO RELATED APPLICATIONS

The present application is a continuation of U.S. patent application Ser. No. 15/921,207, filed Mar. 14, 2018 and titled GENERATING CARTOON IMAGES FORM PHOTOS, which claims priority under 35 U.S.C. § 119 to U.S. Provisional Patent Application No. 62/473,783, filed Mar. 20, 2017 and titled GENERATING CARTOON IMAGES FROM PHOTOS, the contents of both of which are incorporated by reference in their entirety.

BACKGROUND

Emojis (a small digital image or icon) are used to express an idea, emotion, etc. in electronic communication. Emojis are popular for expressing emotions in video conferencing, instant messaging, messaging applications and chat applications. In 2015, The Oxford Word of the Year was the 'laughing face with tears' emoji, due to its popularity. As can be expected, the most popular emojis have been those of faces, which are the round, canary-yellow colored icons that are so widely used. In Asia, stickers (a digital image with a character illustrating an emotion or action via body language or facial reaction) have also gained in popularity in recent years, because they are larger and can express more variety. Unlike emojis, stickers are not tied to a Unicode specification and are simply images that are sent cross-platform.

This background description provided herein is for the purpose of generally presenting the context of the disclosure.

SUMMARY

This specification relates to systems and methods for generating cartoon images from photos. According to one aspect of the subject matter described in this disclosure, a system includes a processor, and a memory storing instructions that, when executed, cause the system to perform operations comprising: receiving an image of a user, determining a template for a cartoon avatar, determining an attribute needed for the template, processing the image with a classifier trained for classifying the attribute included in the image, determining a label generated by the classifier for the attribute, determining a cartoon asset for the attribute based on the label, and rendering the cartoon avatar personifying the user using the cartoon asset.

In general, another aspect of the subject matter described in this disclosure includes a method for generating cartoon images from photos that includes: receiving, using one or more computing devices, an image of a user, determining, using the one or more computing devices, a template for a cartoon avatar, determining, using the one or more computing devices, an attribute needed for the template, processing, using the one or more computing devices, the image with a classifier trained for classifying the attribute included in the image, determining, using the one or more computing devices, a label generated by the classifier for the attribute, determining, using the one or more computing devices, a cartoon asset for the attribute based on the label, and rendering, using the one or more computing devices, the cartoon avatar personifying the user using the cartoon asset.

Other implementations of one or more of these aspects include corresponding systems, apparatus, and computer programs, configured to perform the actions of the methods, encoded on computer storage devices.

These and other implementations may each optionally include one or more of the following features. For instance, another aspect of the subject matter of this disclosure may be embodied in methods that include determining a set of cartoon assets associated with the attribute, wherein each cartoon asset has an associated label, mapping the label to the set of cartoon assets, determining whether the cartoon asset is available within the set of cartoon assets based on the mapping, responsive to determining that the cartoon asset is available within the set of cartoon assets, selecting, from the set of cartoon assets, the cartoon asset for the rendering, determining a cartoon style of the cartoon avatar, determining the set of cartoon assets associated with the attribute based on the cartoon style, determining a cartoon expression of the cartoon avatar, determining the set of cartoon assets associated with the attribute based on the cartoon expression, organizing the cartoon asset into a position relative to other cartoon assets corresponding to other facial attributes in the template, and rendering the cartoon avatar based on the organized cartoon asset. In another instance, the operations may include responsive to determining that the cartoon asset is unavailable within the set of cartoon assets, selecting a default cartoon asset for the rendering, presenting the cartoon avatar on a display of a user device, receiving user input on the display, editing the cartoon asset for the attribute included in the cartoon avatar based on the user input, and re-rendering the cartoon avatar based on the edited cartoon asset.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

One technical issue is making messaging, particularly chat messaging and mobile messaging, more personalized to users so that the messaging includes more nuance and tone. In particular for existing one-size-fits-all emojis with limited animation capabilities, there is no way to customize and vary the expressiveness of the communication because messaging is limited to the same set of emojis for everyone. There is no personalization of the emojis to particular users. The present disclosure uses computer vision and machine learning algorithms to significantly add more personalization to emojis using photographs including faces of the particular users.

The present disclosure solves this technical communication problem by using advanced algorithms in computer vision and machine learning to customize emojis and stickers (a digital image with a character illustrating an emotion or action via body language or facial reaction) to a significantly higher level. More specifically, the present disclosure creates a system or pipeline of processes that take, for example, a photograph of a user including the face (e.g., a 'selfie') and convert it to a personalized emoji. The personalized emoji is added to an emoji list for use in other user applications. The representation of the personalized emoji is recognizable by fellow users as the user's face. The conversion of a photograph including a face into a personalized emoji requires mapping of one or more attributes of the face (e.g., as hairstyle, skin tone, hair color, hair length, eye color, etc.) to a set of pre-defined cartoon templates or assets. Each set of pre-defined cartoon templates or assets may be associated with a cartoon representation of the corresponding facial attribute. A personalized emoji is composed and rendered using those mapped cartoon templates. The pipeline is completely automated, but the resulting personalized emoji is editable, so that users may customize the personalized emoji further to their taste.

Another technical problem solved by the present disclosure is to use computer vision and machine learning more efficiently. In particular, as described below, the present disclosure advantageously uses existing deep neural networks by providing shallow neural network models with different connection layer configurations. The connection layer configurations may use and extract attributes and labels from deep neural networks to create a classifier that can be used for the above purposes. Such a classifier requires less training data to implement.

Figure 1:
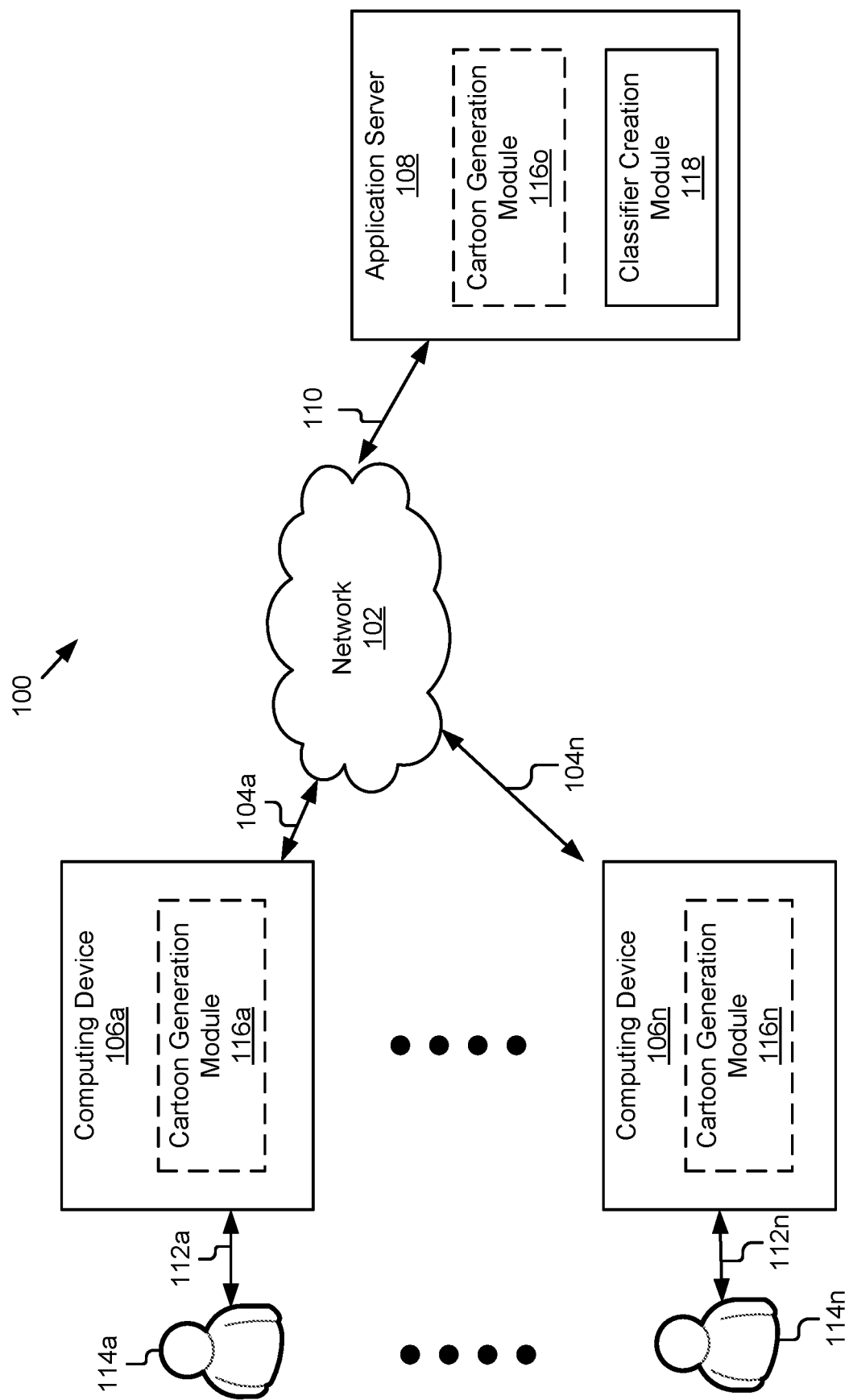
FIG. 1 is a block diagram of an example system for generating cartoon images from photos.

FIG. 1 illustrates a block diagram of an example system 100 for generating cartoon images from photos. The example system 100 comprises a plurality of computing devices 106a-106n, a network 102, and an application server 108. The system 100 as illustrated has user (or client) computing devices 106a through 106n typically utilized by users 114a through 114n to access the application server 108 hosting applications, websites or services via a network 102. The system 100 may include other messaging or application servers (not shown). In the illustrated example, these entities are communicatively coupled via the network 102.

Figure 2:
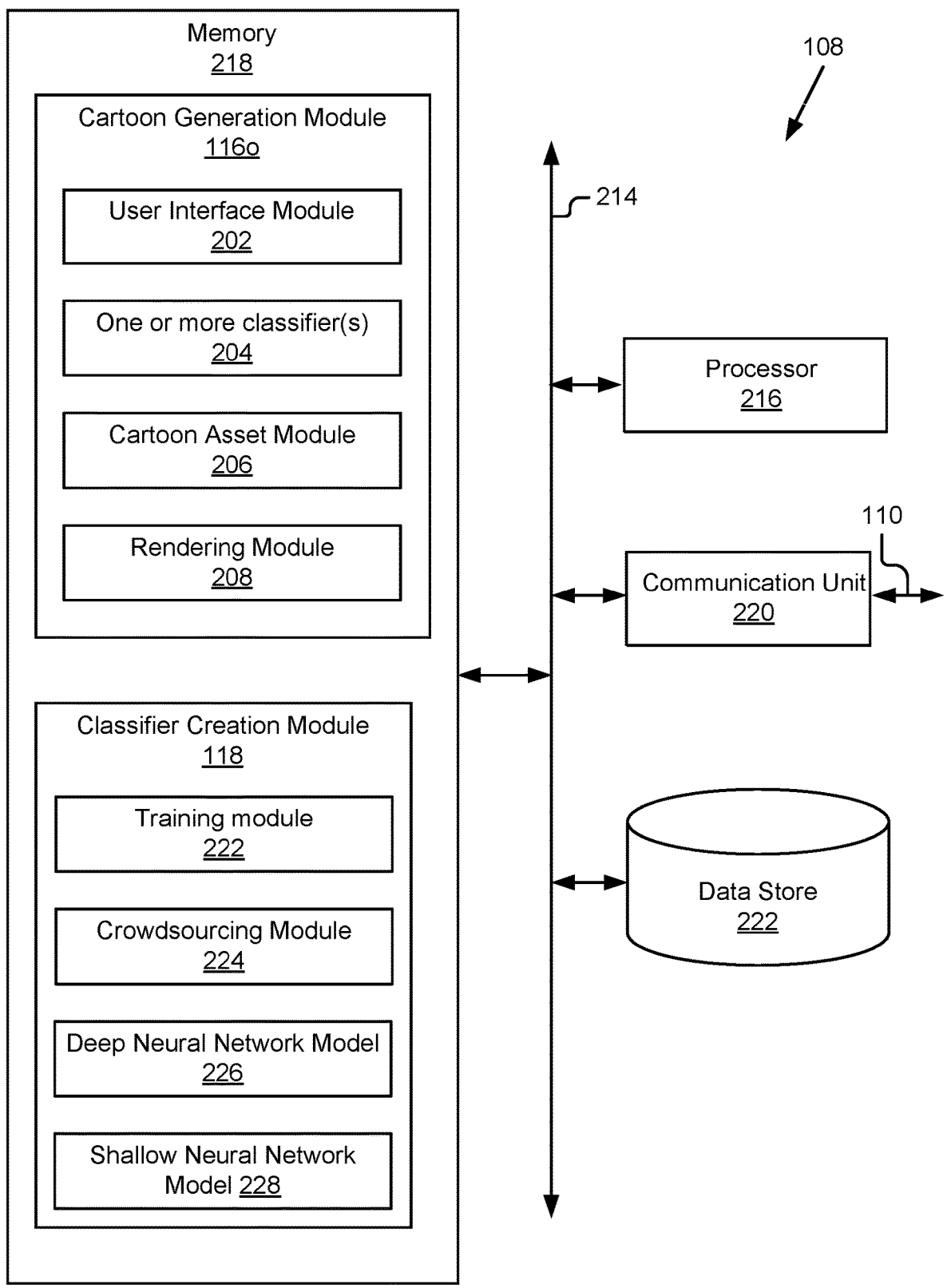
FIG. 2 is a block diagram illustrating an example computing device including a cartoon generation module and the classifier creation module.

FIG. 2 is a block diagram of an example application server 108, which may be representative of the application server 108 or the computing device. As depicted, the application server 108 may include a processor 216, a memory 218, a communication unit 220, and a data store 222, which may be communicatively coupled by a communication bus 214. The memory 218 may include one or more of the cartoon generation module 116 and the classifier creation module 118.

The processor 216 may execute software, instructions or routines by performing various input, logical, and/or mathematical operations. The processor 216 may have various computing architectures including, for example, a complex instruction set computer (CISC) architecture, a reduced instruction set computer (RISC) architecture, and/or an architecture implementing a combination of instruction sets. The processor 216 may be physical and/or virtual, and may include a single core or plurality of cores (processing units). In some implementations, the processor 216 may be capable of generating and providing electronic display signals to a display device, supporting the display of images, capturing and transmitting images, performing complex tasks including various types of feature extraction and sampling, etc. In some implementations, the processor 216 may be coupled to the memory 218 via the bus 214 to access data and instructions therefrom and store data therein. The bus 214 may couple the processor 216 to the other components of the computing device 106 including, for example, the memory 218, communication unit 220, and the data store 222.

The memory 218 may store and provide access to data to the other components of the application server 108. In some implementations, the memory 218 may store instructions and/or data that may be executed by the processor 216. The memory 218 is also capable of storing other instructions and data, including, for example, an operating system, hardware drivers, other software applications, databases, etc. The memory 218 may be coupled to the bus 214 for communication with the processor 216, the communication unit 220, the data store 222 or the other components of the application server 108. The memory 218 may include a non-transitory computer-usable (e.g., readable, writeable, etc.) media, which can be any non-transitory apparatus or device that can contain, store, communicate, propagate or transport instructions, data, computer programs, software, code, routines, etc., for processing by or in connection with the processor 216. In some implementations, the memory 218 may include one or more of volatile memory and non-volatile memory (e.g., RAM, ROM, hard disk, optical disk, etc.). It should be understood that the memory 218 may be a single device or may include multiple types of devices and configurations.

The bus 214 can include a communication bus for transferring data between components of the application server 108 or between the application server 108 and the computing devices 106a, 106n. The bus 214 may include a network bus system including the network 102 or portions thereof, a processor mesh, a combination thereof, etc. In some implementations, the cartoon generation module 116 and the classifier creation module 118 may cooperate and communicate via a software communication mechanism implemented in association with the bus 214. The software communication mechanism can include and/or facilitate, for example, inter-process communication, local function or procedure calls, remote procedure calls, network-based communication, secure communication, etc.

The communication unit 220 may include one or more interface devices for wired and wireless connectivity with the network 102 and the other entities and/or components of the system 100 including, for example, the computing devices 106, etc. For instance, the communication unit 220 may include, but is not limited to, cable interfaces (e.g., CAT-5); wireless transceivers for sending and receiving signals using Wi-Fi™; Bluetooth®, cellular communications, etc.; universal serial bus (USB) interfaces; various combinations thereof; etc. The communication unit 220 may be coupled to the network 102 via the signal line 110. In some implementations, the communication unit 220 can link the processor 216 to the network 102, which may in turn be coupled to other processing systems. The communication unit 220 can provide other connections to the network 102 and to other entities of the system 100 using various standard communication protocols, including, for example, those discussed elsewhere herein.

The data store 222 is an information source for storing and providing access to data. In some implementations, the data store 222 may be coupled to the components 216, 218, 220 of the application server 108 via the bus 214 to receive and provide access to data. In some implementations, the data store 222 may store data received from the other entities 106 or 108 of the system 100, and provide data access to these entities. The data store 222 can include one or more non-transitory computer-readable media for storing the data. In some implementations, the data store 222 may be incorporated with the memory 218 or may be distinct therefrom. In some implementations, the data store 222 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Although not shown, the computing device 106 or the application server 108 (or both) may include one or more user applications. The user applications are representative of any user application that is operational on the computing device 106 or the application server 108. As noted above, the user application may be a social networking application, a messaging application, a photo sharing application, a video conferencing application, etc. The user application is coupled for communication with the respective computing device 106 or the application server 108 to receive, send or present messages, status, commands and other information.

As depicted in FIG. 2, the memory 218 may include the cartoon generation module 116o and the classifier creation module 118. The cartoon generation module 116o comprises a user interface module 202, one or more classifiers 204, a cartoon asset module 206, and a rendering module 208. The classifier creation module 118 comprises a training module 222, a crowdsourcing module 224, a deep neural network model 226, and a shallow neural network model 228. The components 202, 204, 206, 208 of the cartoon generation module 116o and the components 222, 224, 226 and 228 of the classifier creation module 118 are coupled for communication with each other and the other components 216, 218, 220, and 222 of the application server 108 by the bus 214. The components 202, 204, 206, 208 of the cartoon generation module 116o and the components 222, 224, 226 and 228 of the classifier creation module 118 are also coupled to the network 102 via the communication unit 220 for communication with the other entities 106 of the system 100.

The components of the cartoon generation module 116 will now be described in more detail. In some implementations, the user interface module 202, the one or more classifiers 204, the cartoon asset module 206, and the rendering module 208 are sets of instructions executable by the processor 216 to provide their respective acts and/or functionality. In other implementations, the user interface module 202, the one or more classifiers 204, the cartoon asset module 206, and the rendering module 208 are stored in the memory 218 of the computing device 106 and are accessible and executable by the processor 216 to provide their respective acts and/or functionality. In any of these implementations, the user interface module 202, the one or more classifiers 204, the cartoon asset module 206, and the rendering module 208 may be adapted for cooperation and communication with the processor 216 and other components 218, 220, and 222 of the application server 108. The operation of the cartoon generation module 116 is also described below with reference to FIGS. 6 and 8.

The user interface module 202 may be steps, processes, functionalities or a device including routines for receiving user inputs and sending those user inputs to one or more other components of the system 100. For example, a user input may include but is not limited to: 1) inputting content, e.g., photos, 2) modifying content, 3) adding or removing cartoon images or icons from a text message, 4) sending a message including cartoon images or icons, 5) receiving and presenting a message having cartoon images and icons, and 6) creating cartoon images or icons.

The user interface module 202 generates user interfaces for a user to input photos, control the generation of cartoon images or icons, and use the cartoon images or icons in one or more user applications. For instance, the user interface module 202 is coupled to the other components of the application server 108 to send and/or receive content including images and control inputs to and/or from the one or more classifiers 204, the cartoon asset module 206, and the rendering module 208. The user interface module 202 is also coupled to the bus 214 for communication and interaction with the other components of the application server 108 and the system 100.

Figure 3A:
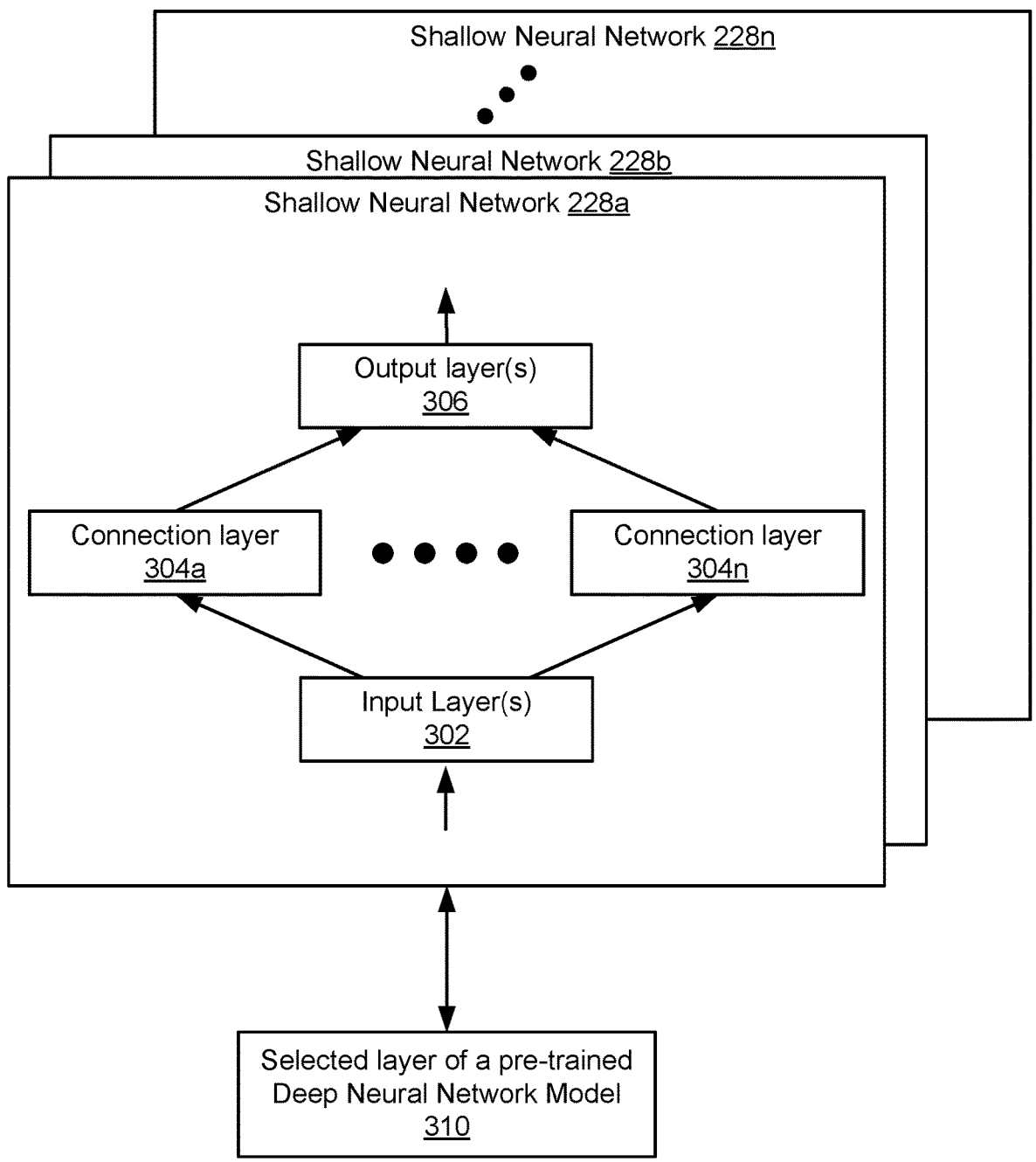
FIG. 3A is a block diagram illustrating a first example of a shallow neural network model.
Figure 3B:
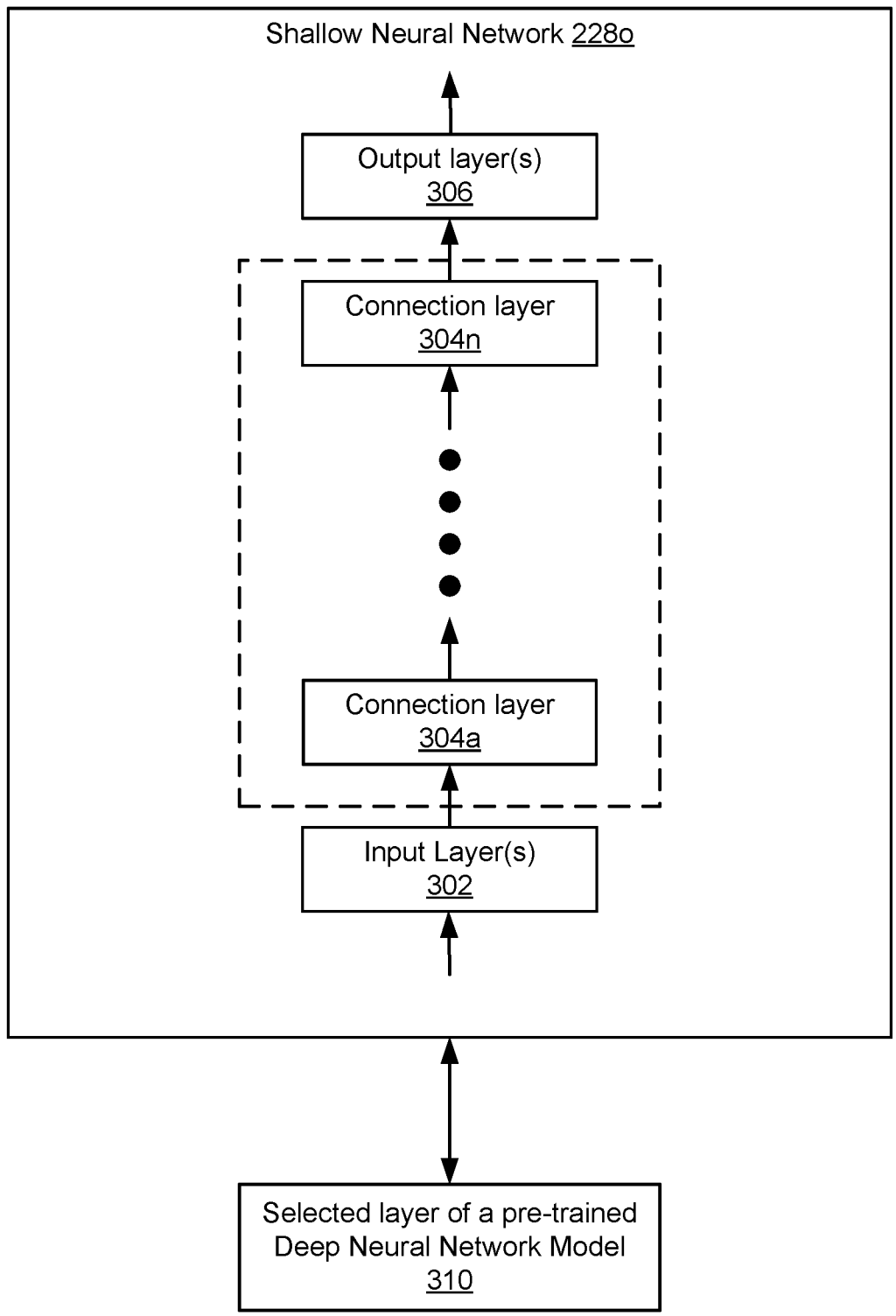
FIG. 3B is a block diagram illustrating a second example of a shallow neural network model.
Figure 3C:
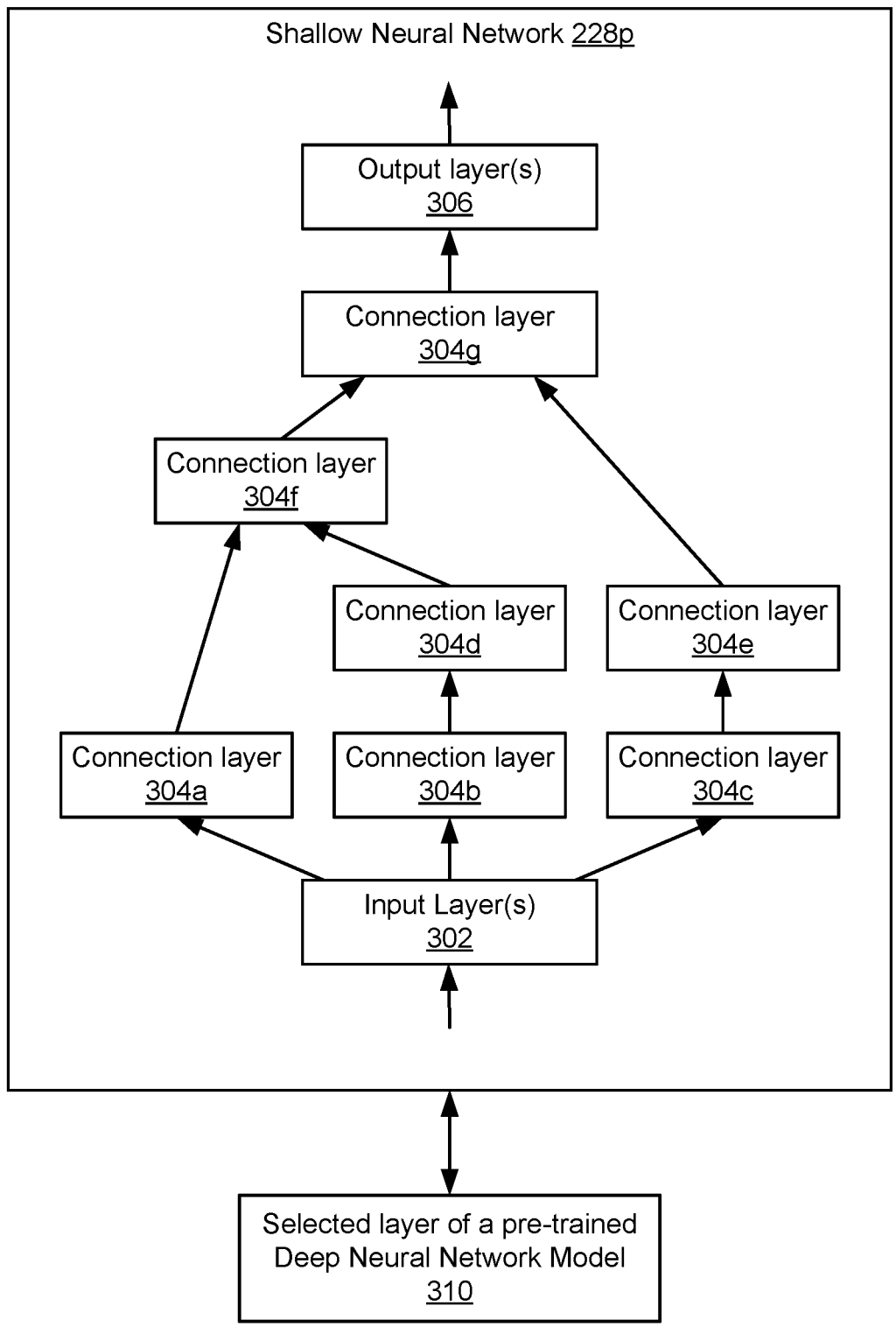
FIG. 3C is a block diagram illustrating a third example of a shallow neural network model.

The cartoon generation module 116 includes a set of one or more classifiers 204. The set of classifiers 204 are used for classifying a photo of a user including the face. Examples of such classifiers 204 are shown in FIGS. 3A-3C and will be described in more detail below. The set of classifiers are machine-learning based algorithms which generate or predict labels. A label corresponds to a value of one or more attributes of the user including the face. For example, attributes of faces may include: skin tone/color, hair length (short, long, medium, bald), hair color (black, dark brown, light brown, auburn, orange, strawberry blonde, dirty blonde, bleached blonde, grey and white), hair texture (straight, wavy, curly, coily), age, gender, eye shape (round eyes, close-set eyes, wide-set eyes, deep-set eyes, prominent eyes, downturned eyes, upturned eyes), mouth shape, jaw/face shape (round, square, triangle, oval), face width (narrow, average, wide), nose shape, eye color, facial hair, face parts composition (proportions), hair type, mouth color, hair style, glasses, ear shape, face markings, headwear, secondary hair colors (non-natural etc.), eyebrow shape (arched, steep arched, S-shaped, rounded, straight), eyebrow thickness (thin, natural, thick), lip shape and a number of other attributes.

In some implementations, the set of classifiers 204 determines one or more groupings of attributes that are weighted differently. For example, the set of classifiers 204 may divide the above attributes into a primary and secondary attribute list. The primary attribute list may include age, gender, eye color, glasses (style and color), skin color, hair color (core colors: blonde, red, brown, black, grey), hair style/length/type, facial hair, jaw shape, face shape, proportions, and eye shape. The secondary attribute list may include mouth shape, nose shape, eyebrow shape, mouth color, ear shape, face markings (dimples, wrinkles, moles), headwear, and secondary hair colors (non-natural, etc.).

In some implementations, the set of classifiers 204 for classifying photos of users into the above attributes are combined into a pipeline. A photo or image may be provided to the pipeline as input. The pipeline process the input photo or image and generates one or more labels for various attributes of the face included in the photo. Each one of the attributes may have its own classifier and the pipeline may combine the set of classifiers 204 in different permutations. For example, the cartoon generation module 116o determines a pipeline that includes a first classifier for classifying eye shape, a second classifier for classifying hair color, and so on. This pipeline receives a photo of a user including the face (e.g., a selfie), processes the photo, and determines a set of labels. For example, the pipeline parameterizes the face and determines one label for each attribute of the user in the photo. Example architecture for such a pipeline are shown and described below with reference to FIGS. 3A-3C. While the present disclosure is discussed throughout this application in the context of determining facial attributes, it should be understood that the architecture, system and methods could also be used to classify other human attributes related to body type, height, shape, etc. or object shapes and attributes. In some implementations, the one or more classifiers 204 are shallow neural network models 228 and provided for use by the classifier creation module 118 (described in more detail below). The classifiers 204 are coupled to receive images from the user interface module 202, generate and provide the labels to the cartoon asset module 206 and the rendering module 208.

Figure 9:
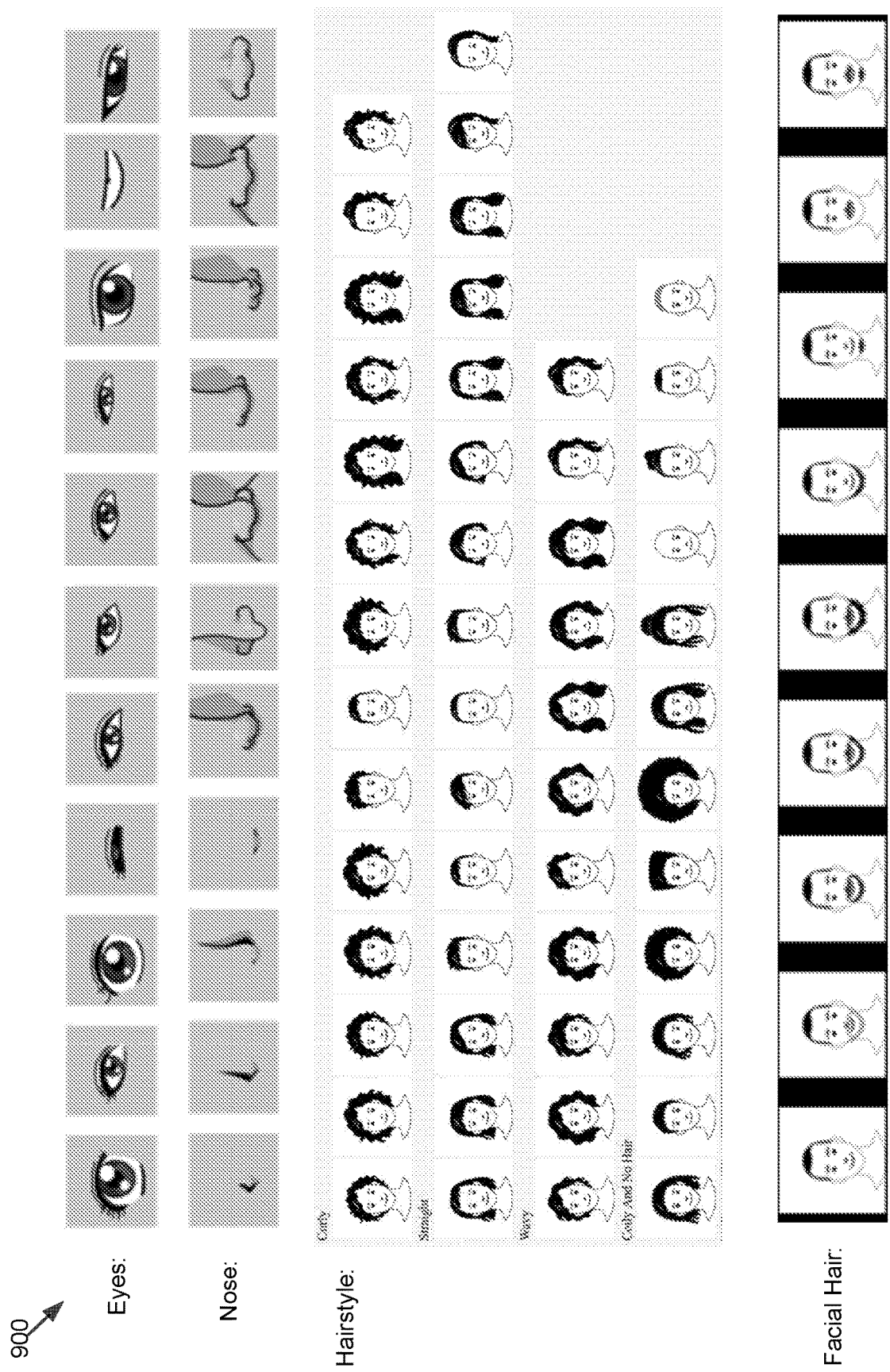
FIG. 9 is a graphical representation of example attributes associated with corresponding sets of cartoon assets.

Referring to FIG. 9, the graphical representation 900 illustrates a set of cartoon assets for some of the example attributes. Each attribute (e.g., eyes, mouth, nose, eyebrows, skin tone, hair, facial hair, etc.) has a corresponding set of cartoon assets available in one or more cartoon styles. Furthermore, a set of emotional expressions is also supported so that each cartoon asset is available in one or more of the supported set of emotional expressions. Each cartoon asset within the set provides a cartoon template that represents the corresponding attribute in varying size, shape, color, length, width, texture, style, etc. For example, the hair style attribute may have a corresponding set of cartoon hair styles (cartoon asset) under one or more types of cartoon hair textures (straight, wavy, curly, coily). In each set of cartoon hair styles, there can be more than one cartoon hair style, such as 10, 11, 12, 13, 14, or more cartoon hair styles. In another example, skin tone may be associated with a palette of more than one color, such as four, five, six, seven, eight, nine, 10 or more colors, one for each possible label generated for skin tone.

The cartoon asset module 206 may be steps, processes, functionalities or a device including routines for storing, managing, and providing access to the individual sets of cartoon assets. In some implementations, the cartoon asset module 206 determines a set of cartoon assets for each attribute to serve as a base set. The base set can be rich enough to create a good cartoon likeness to any face. The base set may correspond to one cartoon or animation style. The cartoon asset module 206 sends the base set to the classifier creation module 118 for training the one or more classifiers 204 to learn the mapping of facial attributes in training dataset of input images to the base set. This mapping is referred to as face parameterization.

The cartoon asset module 206 receives a set of cartoon assets in a new cartoon style or emotional expression. The cartoon asset module 206 determines whether the new cartoon style or emotional expression is compatible with the existing face parameterization. If it is determined to be compatible, the cartoon asset module 206 maps the cartoon assets from the base set to the new cartoon style or emotional expression and derives a new set of cartoon assets for the attributes. This is possible because the face parameterization does not change. Face parameterization is decoupled from the cartoon style or emotional expression. This decoupling is advantageous because there is no need to retrain the one or more classifiers 204 whenever a new cartoon style or emotional expression is desired for cartoon avatars. In some implementations, the cartoon assets are stored in the data store 222 or another portion of memory 218. The cartoon assets can be accessed and retrieved from those sources by the cartoon asset module 206. It should be understood that there may be any number of cartoon asset groupings. For example, the cartoon assets may be grouped by cartoon style from different animators or animation studios. In another example, the cartoon assets for the different attributes may be grouped under different cartoon emotional expressions.

Given a set of one or more labels for various attributes of faces, the cartoon asset module 206 determines the corresponding sets of cartoon assets. The cartoon asset module 206 queries the sets of cartoon assets and maps the one or more labels to the corresponding sets of cartoon assets in real time. The cartoon asset module 206 selects those assets from the sets of cartoon assets that match the labels. For example, the cartoon asset module 206 maps the label received for the "nose" attribute to the set of cartoon assets associated with that attribute and selects a cartoon asset (e.g., asset representing an aquiline nose) that matches the label. In some implementations, the level of matching is ranked and those cartoon assets above a threshold rank are used.

In some implementations, in addition to receiving the set of one or more labels for facial attributes, the cartoon asset module 206 receives one or more user selections of a cartoon style and an emotional expression. For example, different users may like different cartoon styles to fit the context of a conversation they are having with others or they may want to use different cartoon styles to express different emotions. The cartoon asset module 206 determines a set of cartoon assets associated with an attribute based on the selected cartoon style and/or emotional expression. The cartoon asset module 206 performs a look up of the matching cartoon assets using the labels in real time. The cartoon asset module 206 sends the determined cartoon assets to the rendering module 208 to render the cartoon avatar based on the matched cartoon assets.

The cartoon asset module 206 is coupled to receive generated labels for facial attributes from the classifiers 204, and coupled to provide cartoon assets to the rendering module 208. For purposes of this disclosure, the terms "asset," "cartoon asset," "cartoon template," "cartoon portion," "cartoon component," and "face part template" are used interchangeably to mean the same thing, namely, a cartoon representation of an attribute used as a template for rendering the personalized emojis.

The rendering module 208 may be steps, processes, functionalities or a device including routines for rendering a cartoon avatar that personifies the user. For example, the cartoon avatar represents a custom image that is recognizable as a cartoon version of the face of the user. In some implementations, the rendering module 208 determines a template for the cartoon avatar. For example, the template may be specific to the cartoon style of the cartoon avatar. The template for an anime style is different from a western style cartoon. The rendering module 208 determines one or more attributes needed by the template for rendering the cartoon avatar in that cartoon style. The rendering module 208 cooperates with the one or more classifiers 204 to determine a corresponding classifier for the one or more attributes that will need to process the incoming image and generate one or more labels. The rendering module 208 cooperates with the cartoon asset module 206 to retrieve cartoon assets based on the one or more labels.

The rendering module 208 uses a rendering platform that composes the cartoon avatar from individual labels, attributes and their corresponding cartoon assets. For example, the rendering module 208 renders a cartoon avatar by organizing the individual cartoon assets into corresponding positions relative to each other, stitching and blending the edges of the cartoon assets. The rendering module 208 also adds fixed elements that are specific to the cartoon style and/or expression according to the template. In the instance where there are no matching assets available for an attribute (e.g., eye shape) within a set, the rendering module 208 uses a default asset associated with that attribute (e.g., a default eye shape of round dots representing the iris) in rendering the cartoon avatar. The rendering module 208 outputs the final cartoon to the user interface module 202 for display to the user in one or more user applications.

Rendering the cartoon avatar and sending it via a user application (e.g., chat messaging) to another computing device 106 can be expensive bandwidth-wise and lead to latency issues. In some implementations, the rendering module 208 facilitates a rendering approach that solves for issues relating to bandwidth and latency. Instead of rendering the cartoon avatar, the rendering module 208 in the cartoon generation module 116 on one computing device 106 sends the face parameters over the network 102 to the application server 108 or to the destination computing device 106. The cartoon generation module 116 in the application server 108 or the destination computing device 106 receives the face parameters, communicates with its own rendering module 208 to render the cartoon avatar at the destination. With this approach, the bytes per chat message used for sending or receiving personalized cartoon avatars via a chat messaging application, for example, is reduced and thereby improving the latency.

The rendering module 208 receives user input via the display for manually editing the cartoon avatar. For example, the user may personally feel his or her hair is wavy and choose to edit the cartoon to change the cartoon hair texture from being curly to wavy. The rendering module 208 changes the face parameterization by editing out the hair texture with the user selected hair texture from the set of cartoon assets corresponding to hair texture and re-rendering the cartoon avatar accordingly. In some implementations, the rendering module 208 generates a full set of cartoon avatars in a plurality of predefined cartoon expressions and/or cartoon styles. The rendering module 208 is coupled to the classifiers 204 to receive generated labels for attributes. The rendering module 208 is coupled to the user interface module 202 to provide the final cartoon for use in messaging and other applications.

The components of the classifier creation module 118 will now be described in more detail. In some implementations, the training module 222, the crowdsourcing module 224, the deep neural network model 226 and the shallow neural network model 228 are sets of instructions executable by the processor 216 to provide their respective acts and/or functionality. In other implementations, the training module 222, the crowdsourcing module 224, the deep neural network model 226 and the shallow neural network model 228 are stored in the memory 218 of the computing device 106 and are accessible and executable by the processor 216 to provide their respective acts and/or functionality. In any of these implementations, the training module 222, the crowdsourcing module 224, the deep neural network model 226 and the shallow neural network model 228 may be adapted for cooperation and communication with the processor 216 and other components 218, 220, and 222 of the application server 108. The operation of the classifier creation module 118 is also described below with reference to FIGS. 4A-5 and 7.

The training module 222 may be steps, processes, functionalities or a device including routines for creating one or more shallow neural network models 228 and training them as classifiers. The training module 222 is coupled to the deep neural network model 226 to access different layers and parts of the deep neural network model 226 as will be described below. The training module 222 identifies one or more layers of the deep neural network model 226 that are insensitive to characteristics in the image that are being detected. For example, layers of the deep neural network model 226 that are insensitive to illumination and shading are desirable. Once the training module 222 has selected layers and organized them, training data is applied to them as will be described below with reference to FIGS. 4A to 8. Once trained, the training module 222 stores the shallow neural network model 228 at the classifier creation module 118 and may also provide the shallow neural network model 228 as a classifier 204 to the cartoon generation module 116. The training module 222 is coupled for interaction and communication with the crowdsourcing module 224, the deep neural network model 226 and the shallow neural network model 228.

The crowdsourcing module 224 may be steps, processes, functionalities or a device including routines for creating a crowd sourced data set that can be provided to the training module 222 for training the shallow neural network model 228 as a classifier 204. The operation of the crowdsourcing module 224 is described below with reference to FIGS. 4A to 8. In the instance where users consent to use of their images, the crowdsourcing module 224 receives an image dataset of unlabeled user images. For example, the user images include "selfie" images. The crowdsourcing module 224 partitions the image dataset. The crowdsourcing module 224 provides the partitioned image datasets to users that review the images and send an attribute and label for the images. This crowdsourcing module 224 is coupled to provide images and attributes to users and receive tuples of images, attributes and labels that the users have classified. This received information is then aggregated to create a set of training data for the shallow neural network model 228. In the case of some attributes such as hairstyle, it is very hard to ask raters to make a single choice out of many, since the number of possible hairstyles is quite large (dozens or even hundreds). In such cases, the crowdsourcing module 224 simplifies the process by limiting selection to one of a few hairstyles (such as long/short/bald and straight/wavy/curly). This can be similarly applied to other attributes. The crowdsourcing module 224 is coupled to receive image datasets, provide image datasets and receive classification data. The crowdsourcing module 224 is coupled to provide the training data to the training module 222.

The deep neural network model 226 is a feedforward neural network with many layers. In some implementations, the deep neural network model 226 is an artificial neural network with multiple hidden layers of units between the input and output layers of a convolutional neural network. The deep neural network model 226 is trained for a specific task. For example, a deep neural network model 226 that has been trained for facial recognition may be used. In some implementations, the deep neural network model 226 is trained using millions of face images to embed face thumbnails into a Euclidean space, where faces of the same identity are closer together than faces from different identities. The deep neural network model 226 is coupled for use by the training module 222.

The shallow neural network model 228 is a neural network that has a limited number of hidden layers. The shallow neural network model 228 can be defined as having fewer than 10 hidden layers, such as 9, 8, 7, 6, 5, 4, 3, or fewer. In some implementations, the shallow neural network model 228 is a shallow neural network model on top of the embedding vector. For example, the shallow neural network model may be on top of the Avgpool embedding vector. The shallow neural network model 228 has a 1024*d* input layer followed by a 64*d* hidden fully connected layer and a softmax layer. One particular advantage of using shallow neural network models 228 is that it requires only about 1000 samples per class to train. The layer of the deep neural network model 226 is selected so that it has enough information for fine-grained facial attributed classification (not only expression classification).

Referring now to FIGS. 3A-3C, examples of shallow neural network models 228 will be described. FIG. 3A is a block diagram illustrating a first example of several shallow neural network models 228*a*-228*n*. FIG. 3A shows that several different shallow neural network models 228*a*-228*n* may be provided. For example, a different shallow neural network model 228*a*-228*n* may be provided for each facial attribute that is being detected in an input image. FIG. 3A also shows an implementation of the configuration for the shallow neural network model 228*a* as being coupled to a selected layer of a pre-trained deep neural network model 310. The shallow neural network model 228*a* includes an input layer 302, one or more connection layers 304*a*-304*n* and an output layer. While only a single output layer is shown in FIGS. 3A-3C, it should be understood that in different implementations, the shallow neural network models 228 may have more than one output layer. The shallow neural network model 228*a* is representative of the other shallow neural network models 228*b*-228*n*. In some implementations, the connection layers 304*a*-304*n* each process a parameter related to the attribute being analyzed by the shallow neural network model 228*a*. This example illustrates how there may be one or more connection layers 304*a*-304*n* coupled in parallel (when multiple attributes are trained together) between the input layer 302 and the output layer 306. While a plurality of connection layers 304*a*-304*n* are shown, in some implementations, there may be only a single connection layer 304*a*. For example, there may be one or more fully connected or convolutional layers, depending on which pre-trained deep network layer is chosen for processing. Furthermore, the size of the connection layers may be varied depending on the amount of training data that is available. An example is pre-trained layer of dimension size 1024, connected to a fully connected layer of dimension size 64 with rectified non-linear units, and then a linear layer connected to an output layer of dimension size 10 (number of output classes).

Referring now to FIG. 3B, another example of a shallow neural network model 228*o* is shown. In this example, the shallow neural network model 228*o* again comprises an input layer 302, one or more connection layers 304*a*-304*n* and an output layer. However, in this example, the connection layers 304*a*-304*n* are coupled in series between the input layer 302 and the output layer 306. This example illustrates how processing different individual parameter may be combined by analyzing them in series to provide more accurate classification of a particular attribute. It should be understood that even though only one shallow neural network models 228*o* is shown, there may be one or more shallow neural network models 228*o* with each shallow neural network models 228*o* generating a different attribute and label.

Referring now to FIG. 3C, another example of a shallow neural network model 228*p* is shown. In this example, the shallow neural network model 228*p* again comprises an input layer 302, one or more connection layers 304*a*-304*g* and an output layer. However, in this example, there are seven connection layers 304*a*-304*g* and they are configured in tiers. A first tier of connection layers 304*a*-304*c* have their input coupled to the output of the input layer 302. A second tier of connection layers 304*d*, 304*e* have an input coupled to the output of connection layers 304*b*, 304*c*, respectively. The third tier is a connection layer 304*f* that receives input from connection layer 304*a* and connection layer 304*d*. The fourth and final tier is a connection layer 304*g* that receives input from connection layer 304*g* and connection layer 304*e*. The output of connection layer 304*g* is input to output layer 306. This provides an example where multiple attributes are trained together. The method includes training some subset of two or more attributes together, even all of them. This allows the system to learn certain correlations between different attributes such as skin tone and eye color. It should be understood that even though only one shallow neural network models 228*p* is shown in FIG. 3C, there may be one or more shallow neural network models 228*p* with each shallow neural network models 228*p* generating a different attribute and label.

The use of shallow neural network models 228 as classifiers 304 is particularly advantageous. More specifically, by dividing the face into attributes and creating and using a shallow neural network model 228 for each attribute makes the generation of cartoon images much more scalable. Any number of shallow neural network models 228 for particular attributes may be quickly and easily trained with smaller data sets. For example, the system configuration and architecture described above with reference to FIGS. 2-3C scales to all faces in the world. The classifier creation module 118 is able to address the problem of attribute selection and rendering to be applicable to wide variety of faces. The classifier creation module 118 can add shallow neural network models 228 as classifiers 304 as needed to account for diverse datasets, and making the classifiers handle a wide variety of skin tones, hair colors, etc. Additionally, the approach of the present disclosure is advantageous because the system and methods provide a generic and configurable way to train a shallow neural network models 228 on top of some other feature without having to write new code.

It should be understood that while specific examples of the shallow neural network model 228 have been described above with reference to FIGS. 3A, 3B, and 3C that in other implementations there may be one or more connection layers for one or more attributes, one or more output layers, and one or more input layers. For example, the shallow neural network model 228 may be trained for multiple attributes jointly, instead of a single attribute at a time. This has the benefit of model compression and potential quality improvements.

Methods

Figure 4A:
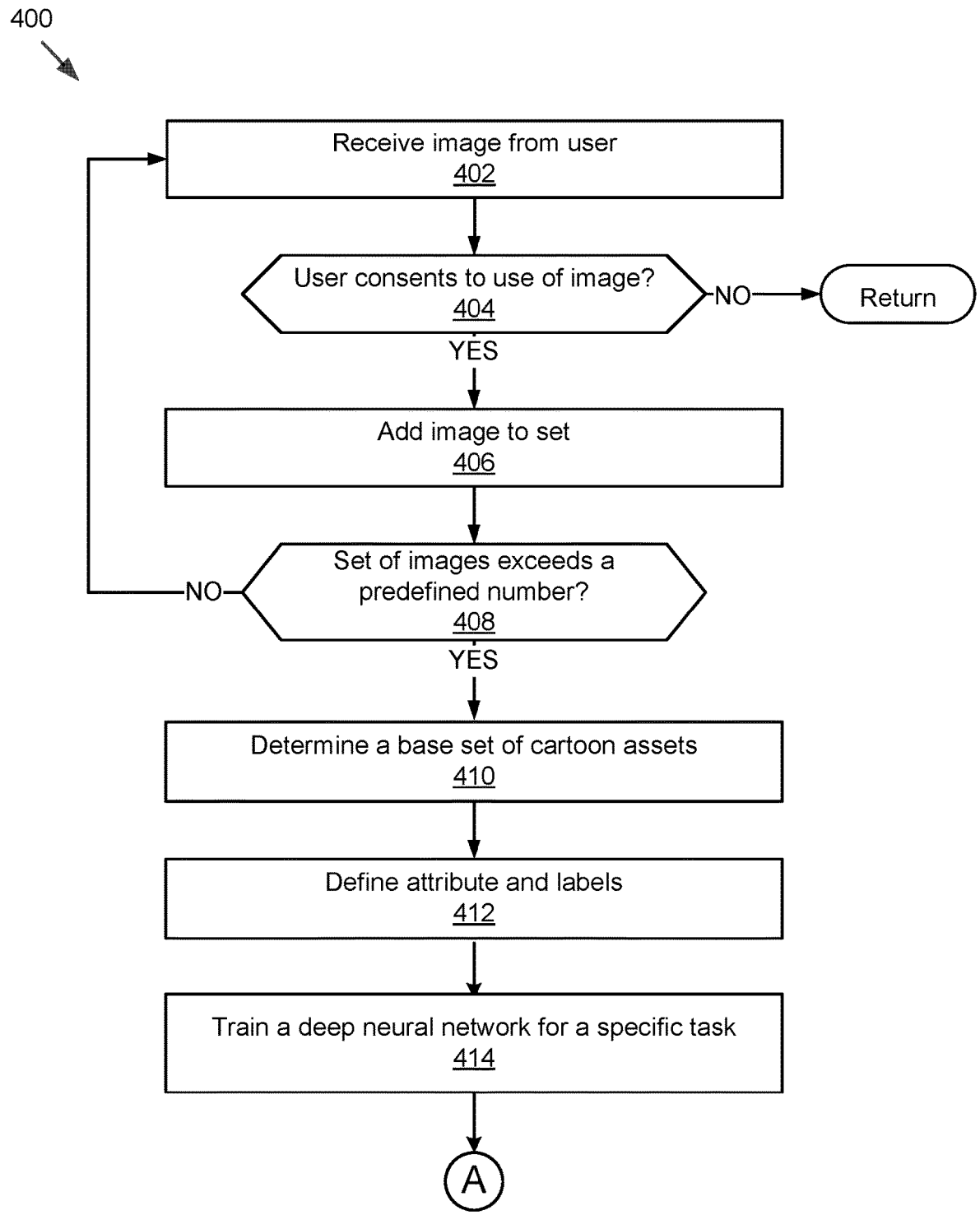
FIGS. 4A and 4B are a flowchart illustrating a first example method for creating a classifier of attributes.
Figure 4B:
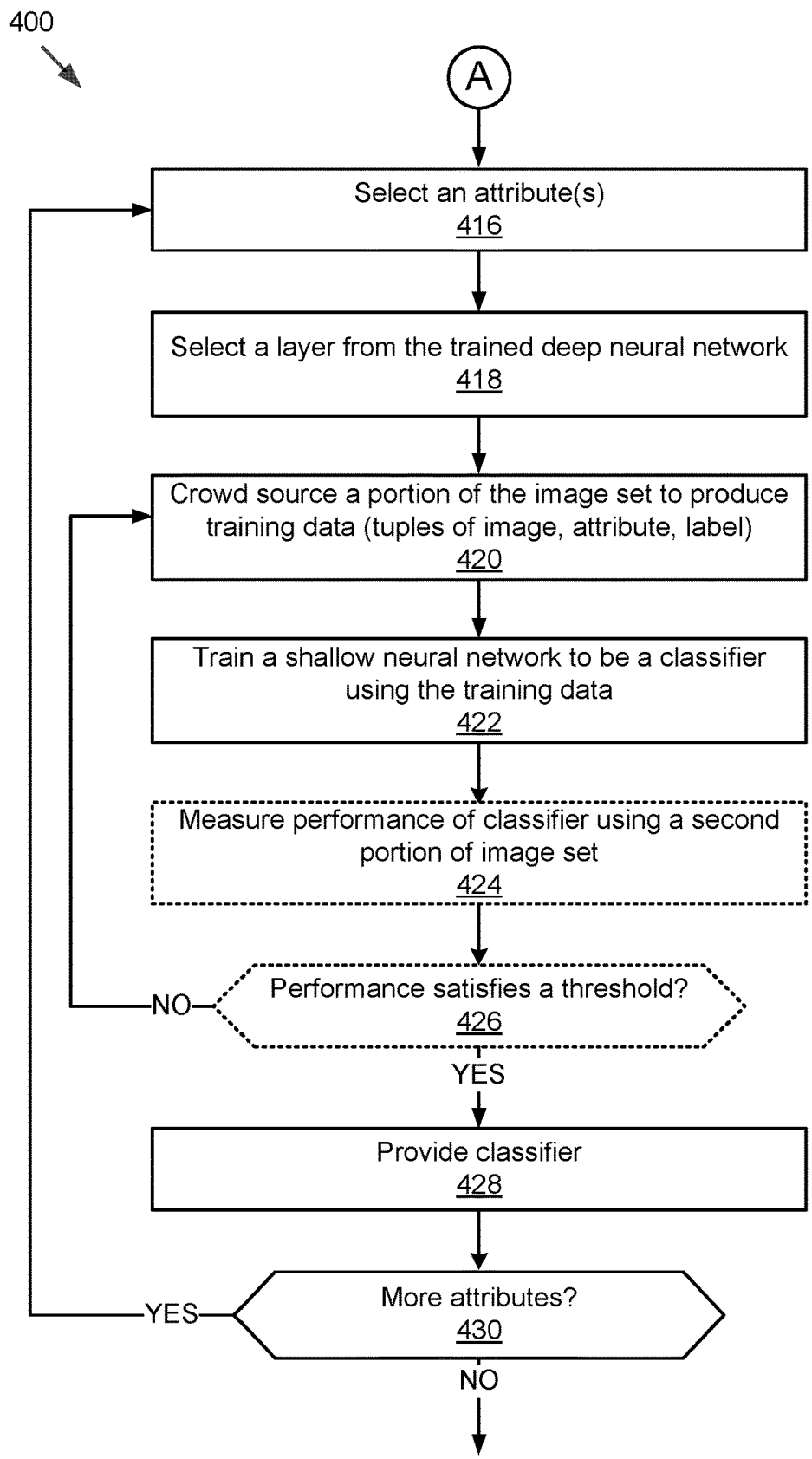

FIGS. 4A and 4B show a first example method 400 for creating a classifier of attributes in accordance with the present disclosure. The method 400 begins by receiving 402 an image from the user. The image may be provided by the computing device 106 to the classifier creation module 118. Then the method 400 determines 404 whether the user has consented to use of her image that was input in block 402.

If not, the method 400 returns and does not process the image. In some implementations, the method 400 returns to block 402 to receive the next image. However, if the user has consented to use of her image that was input in block 402, the method 400 continues to block 406 and adds the image to a set. For example, the large data set of images may be collected from large datasets of 'selfie' images where the users have provided consent for the using the images. No personal information other than the image itself is needed for the creation of the classifier. Next, the method 400 determines 408 whether the set of images exceeds a pre-defined number. For example, there can be more than one predefined number, such as 1 million, 100,000, 10,000 or even 1,000. If the set of images does not exceed the pre-defined number, the method 400 loops through blocks 402-406 to gather more images. If the set of images exceeds the pre-defined number, the method 400 proceeds to block 410. In block 410, the method 400 determines a base set of cartoon assets. Next, the method 400 defines 412 attributes and labels. The present disclosure uses a parts based approach. The parts (attributes) of the face are defined. For example, attributes may include: skin tone/color, hair length, hair color, age, gender, eye shape, mouth shape, jaw/face shape, nose shape, eye color, eyebrow shape, facial hair, face parts composition (proportions), hair type, mouth color, hair style, glasses, ear shape, face markings, headwear and secondary hair colors, eyebrow shape, eyebrow thickness, lip shape and a number of other attributes. For each part (attribute), a set of labels are provided, each label associated with a cartoon asset in the base set.

The method 400 then continues by training 414 a deep neural network for a specific task. For example, the specific task could be to find images with a particular emotion or with some other feature. In some implementations, a deep neural network already trained for a task such as facial recognition could be used.

Referring now also to FIG. 4B, the method 400 continues in block 416 to create one or more attribute specific classi-fiers. In block 416, the method 400 selects an attribute. Then the method 400 selects 418 a layer from the trained deep neural network 226 from block 414. One implementation of this block 418 is described in more detail below with reference to FIG. 4C. The layer of the trained deep neural network 226 is selected by selecting a layer that will provide good discrimination for the selected attribute in different images and be invariant to parameters that do not affect the selected attribute. For example, the method 400 is config-ured to be invariant to parameters such as the illumination in the photograph, the pose of the person and the background; while also being sensitive to the specific attributes that are needed for building a cartoon avatar, such as skin tone, hair color, facial hair etc.

Next, the method 400 identifies an image set that can be used to generate the classifier 204. In some implementations, this image set is divided into two portions, a first portion that is used for training and a second portion that is used for testing. The method 400 continues by crowd sourcing 420 the first portion of the image set to produce training data (tuples of image, attribute, label). More specifically, a crowdsourcing task that provides images and the attributes is sent out to users for identification of a label based on the user's review of the image. For example, in the case of a specific attribute such as hair color, a crowdsourcing task is generated. In the crowdsourcing task, the task raters are asked to choose, for each image, one of 5 labels for hair color (e.g., black, brown, blonde, gray/white, or none). Once the first portion of the image set has been crowd sourced, the results are used as a training set of data. The method 400 then trains 422 a shallow neural network model 228 to be a classifier using the set of training data. Continuing the example above, the shallow neural network model 228 learns how to classify a given image into one of these 5 classes for hair color (e.g., black, brown, blonde, gray/white, or none).

Next, FIG. 4B shows some optional steps that are indi-cated with dashed lines. The method 400 can optionally measure 424 performance of classifier using the second portion of image set. This second portion of the image set was held out of training and the classifier has not processed any images in this set. The method then optionally 400 determines 426 whether the performance of the shallow neural network model 228 as a classifier satisfies a threshold of performance, e.g., accuracy. If not, the method 400 returns to blocks 420-424 to do additional training and testing of the shallow neural network model 228. On the other hand, if the shallow neural network model 228 satisfies the threshold of performance, the method 400 provides 428 the shallow neural network model 228 as a classifier. After training, the method 400 produces a high-accuracy classifier for hair colors. The shallow neural network model 228 is provided to the cartoon generation module 116 for storage and use therein. Next, the method 400 determines 430 whether there are more attributes for which a classifier is to be created. The process in blocks 416 to 428 can be used to produce similar classifiers for other attributes such as skin tone, eye shape, nose, hairstyles, etc. If there are more attributes that need classifiers, the method 400 return to block 416 to select the next attribute needing a classifier. If not, the method 400 continues to begin use of the generated classifiers.

Figure 4C:
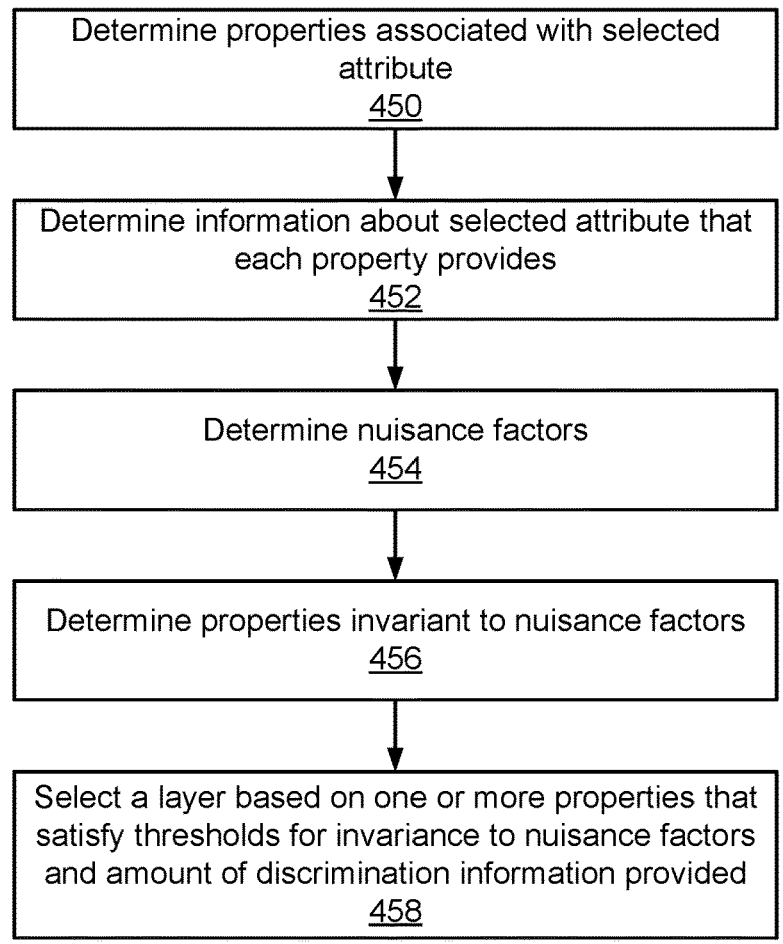
FIG. 4C is a flowchart illustrating an example method for selecting a layer of a deep neural network.

Referring to FIG. 4C, an example method 418 for select-ing a layer of a deep neural network 226 is described. The method 418 begins by determining 450 properties associated with selected attribute. Then the method 418 determines 452 information about the selected attribute that each property provides. The method 418 determines 454 nuisance factors. For example, shading or illumination are nuisance factors that have been identified. The method 418 then determines 456 properties invariant to nuisance factors. The method 418 then selects 458 a layer based on one or more properties that satisfy thresholds for invariance to nuisance factors and amount of discrimination information provided. For example, a layer of a deep neural network 226 for facial recognition, (e.g., an "Avgpool 1K" layer of FaceNet) along with a specific attribute such as "skin color" may be used where the nuisance factor would be "illumination" since the presence of illumination causes difficulty in pinpointing skin tone.

Figure 5:
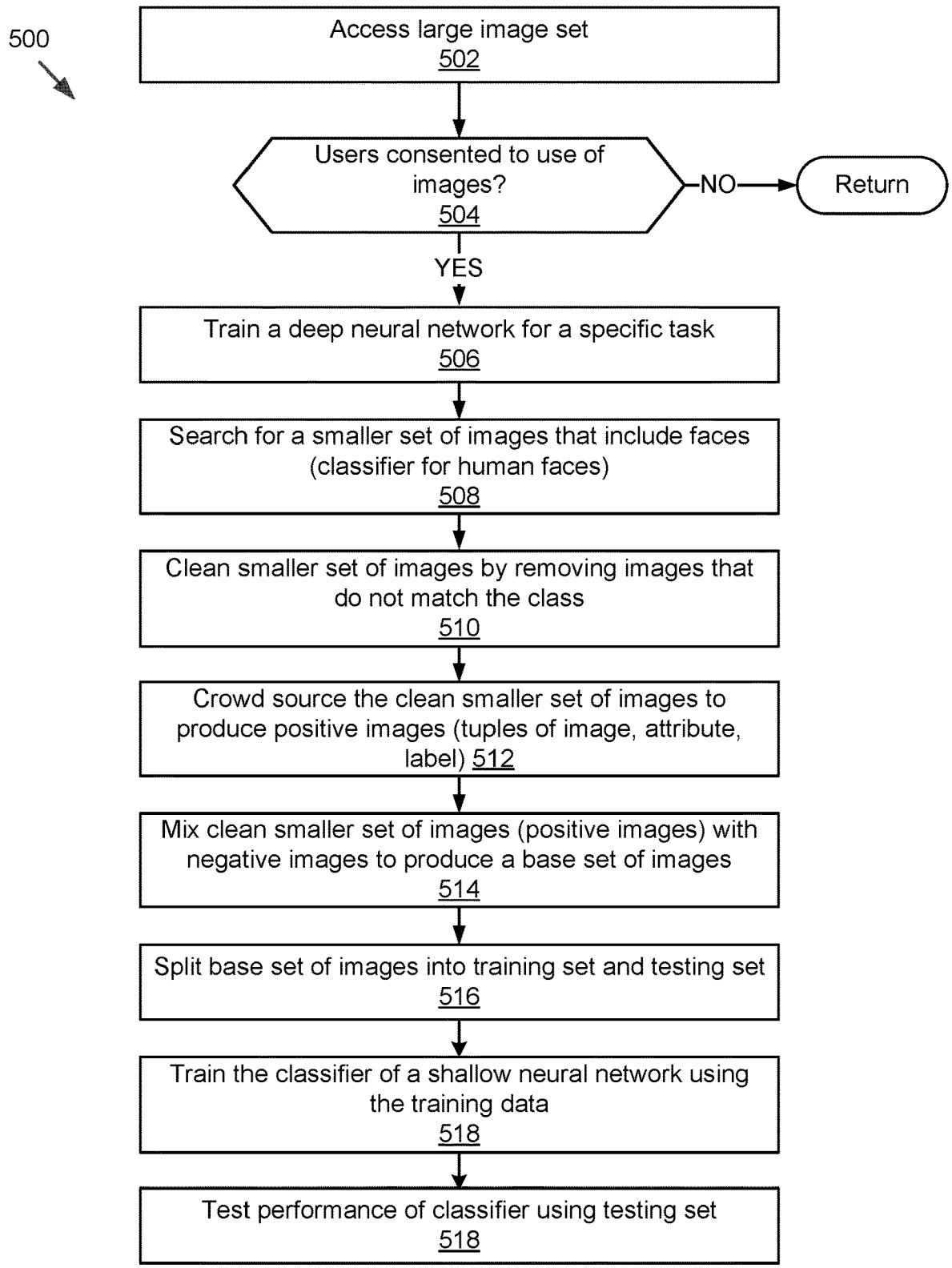
FIG. 5 is a flowchart illustrating a second example method for creating a classifier of attributes.

FIG. 5 shows a flowchart illustrating a second example method 500 for creating a classifier of attributes. The method 500 accesses 502 a large image data set. The large image data set may have been used for purposes other than generating facial classifiers. Next the method 500 deter-mines 504 whether the users that provided the images in the large image data set consented to use of their images. If not, the method 500 returns and does not process the large image data set. However, if the users have consented to use of their images, the method 500 continues to block 506. In block 506, the method 500 uses the images to train a deep neural network 226 for a specific task. The task need not be related to identifying facial attributes, but needs to include enough information about processing the images that can be used for fine grain discrimination of facial attributes. For example, millions of images may have been used to train the deep neural network 226 to perform object recognition of inanimate objects. The method 500 then searches 508 for a smaller set of images that include faces (classifier for human faces) from the large image data set. For example, this smaller set of image data may include 10,000 to 20,000 images. The method 500 then cleans 510 the smaller set of images from block 508 by removing images that do not match the class. The method 500 then crowd sources 512 the clean smaller set of images to produce positive images (tuples of image, attribute, label). In some implementations, this can be done by a dedicated group of human raters rather than crowdsourcing. Next, the method 500 mixes 514 the clean smaller set of images (positive images) with negative images to produce a base set of image. The method 500 splits 516 this base set of images into a training set and a testing set. Then the method 500 trains 518 the classifier of a shallow neural network using the training data. The method 500 tests 518 the performance of classifier using testing set. If the performance is satisfactory, the classifier is provided for use.

Figure 6:
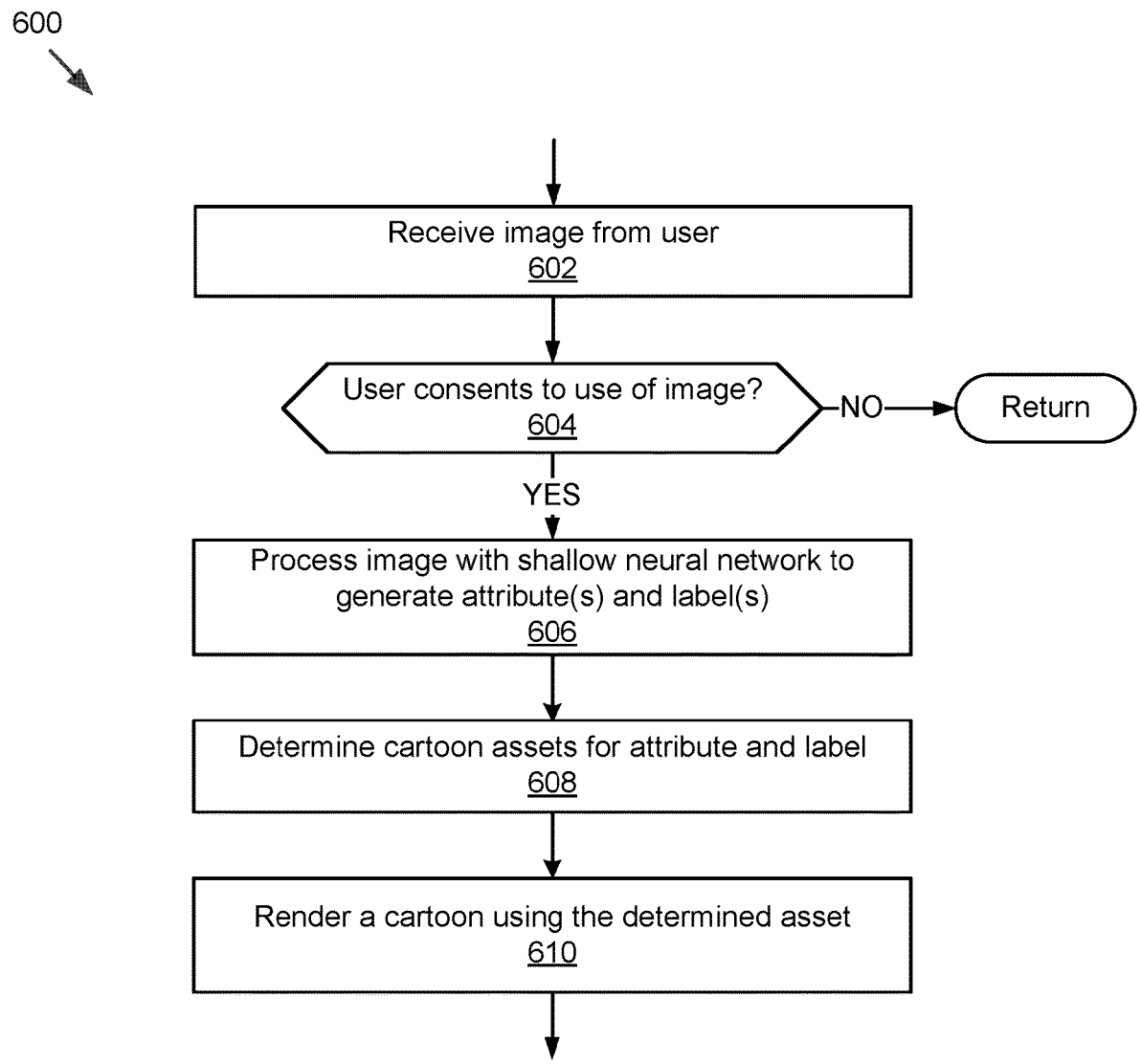
FIG. 6 is a flowchart illustrating a first example method for creating a cartoon using a classifier.

FIG. 6 is a flowchart illustrating a first example method 600 for creating a cartoon using a classifier 204. The method 600 begins by receiving 602 an image from the user. The image may be provided by the computing device 106 to the cartoon generation module 116. Then the method 600 determines 604 whether the user has consented to use of her image that was input in block 602. If not, the method 600 returns and does not process the image. In some implementations, the method 600 returns to block 602 to receive another image. However, if the user has consented to use of her image that was input in block 602, the method 600 continues to block 606 and processes image with a shallow neural network model 228 as a classifier 204 to generate one or more attribute(s) and label(s). One implementation of this process 606 is described in more detail below with reference to FIG. 7. Then the method 600 determines 608 the cartoon assets corresponding to the attribute and label. For example, the cartoon asset module 206 may search the cartoon assets for particular assets that match the attribute and label provided by the block 606. Once the cartoon assets corresponding to the attribute and label have been identified, the method 600 renders 610 a cartoon using the determined asset. In some implementations, users are given the option to edit cartoon to meet their satisfaction by another component. This component allows manual editing as this is simply achieved by changing the avatar or face parameterization (e.g., selection of face part templates). For example, allowing intuitive user controls such as "more square jaw", "curlier hair", "bigger eyes" and then mapping from that user control to template space of the cartoon.

Figure 7:
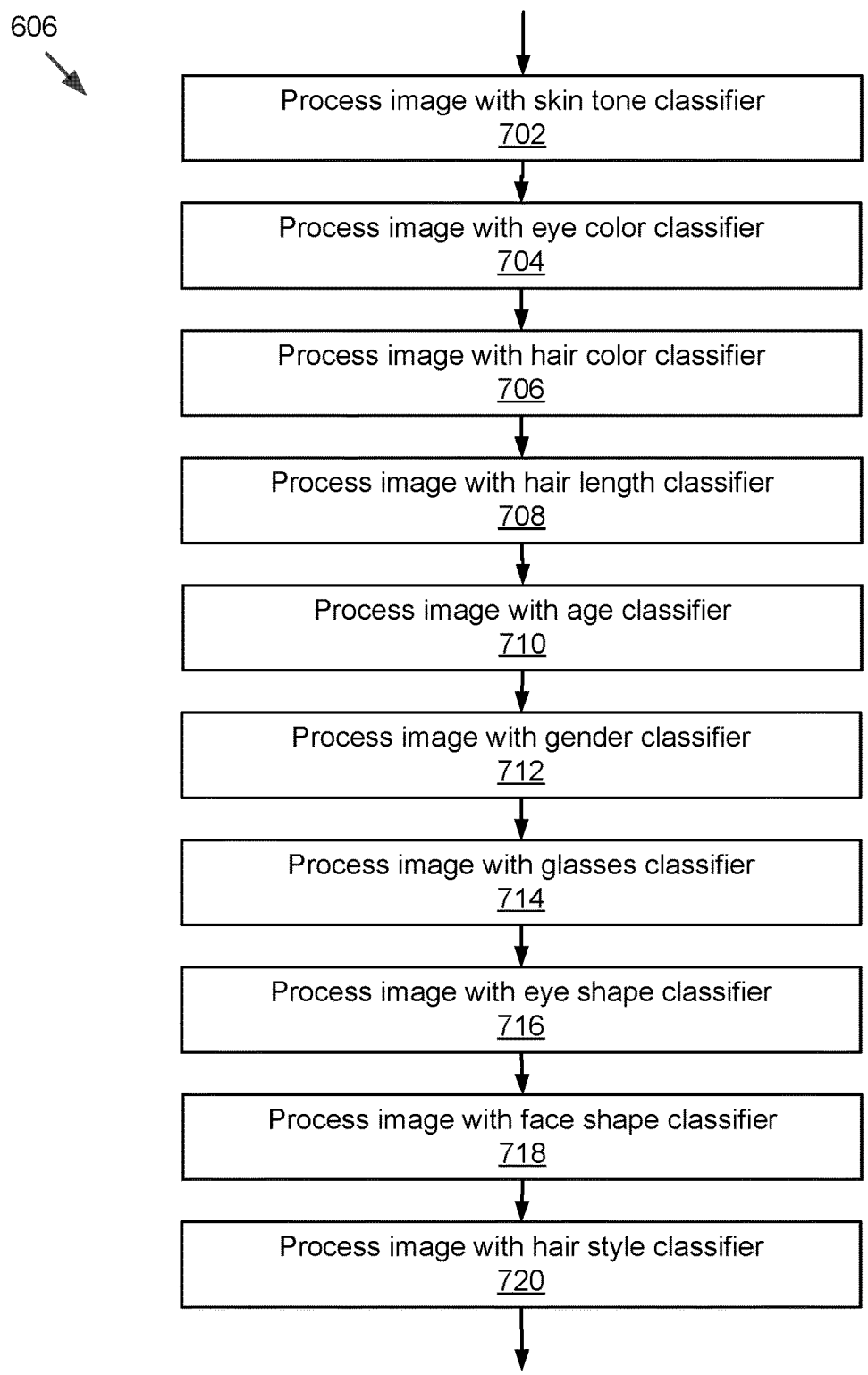
FIG. 7 is a flowchart illustrating an example method for generating attributes and labels.

FIG. 7 is a flowchart illustrating an example method 606 for generating attributes and labels. It should be understood that the method 606 is merely one example way to processes an image with a pipeline of a plurality of shallow neural network models 228 as classifiers 204 to generate one or more attribute(s) and label(s). Specifically, some implementations may have more or fewer classifiers than those depicted in FIG. 7 and FIG. 7 is not all inclusive of the classifiers that may process an input image. Additionally, it should be understood that the present disclosure contemplates that the order of the classifiers may be different than the order depicted in FIG. 7. Other orders of evaluating the attribute classifiers may be possible, and other permutation of sets of the listed classifiers are possible. For example, although not shown the example method 606 may include a classifier for eyebrows. It should be understood that various modifications to the example method 606 are contemplated by the present disclosure.

The method 606 begins by processing 702 the image with a skin tone classifier. For example, the attribute is skin tone and the possible labels are defined by a finite number of types under the Fitzpatrick scale and consistent with Unicode. Then the method 606 processes 704 the image with an eye color classifier. For example, the attribute is eye color and the possible labels are blue, green, brown, and dark brown. Next, the method 606 processes 706 the image with a hair color classifier. For example, the attribute is hair color and the possible labels are blonde, red, brown, black, dark brown, light brown, auburn, orange, strawberry blonde, dirty blonde, bleached blonde, grey and white. Then the method 606 processes 708 the image with a hair length classifier. For example, the attribute is hair length and the possible labels are bald, short, medium, and long. Next, the method 606 processes 710 the image with an age classifier. Then the method 606 processes 712 the image with a gender classifier. For example, the attribute is gender and the possible labels are male and female. Next, the method 606 processes 714 the image with a glasses classifier. For example, the attribute is glasses and the possible labels are defined by a limit number of colors and styles of glasses. Then the method 606 processes 716 the image with an eye shape classifier. For example, the attribute is eye shape and the possible labels are single eyelid and double eyelid. Next, the method 606 processes 718 the image with a face shape classifier. Then the method 606 processes 720 the image with a hair style classifier. There may be more than one hair style, such as 10, 20, 30, 40, 50 or more distinct hair styles. For example, the attribute is hair style and the possible labels include straight, wavy, curly, updo (bun, ponytail), braids, pigtail, mohawk, and bangs. Once each of the classifiers 204 has processed the image, the tuples of image, attribute and label are collected and used for generation of the cartoon as has been described above with reference to FIG. 6.

Figure 8:
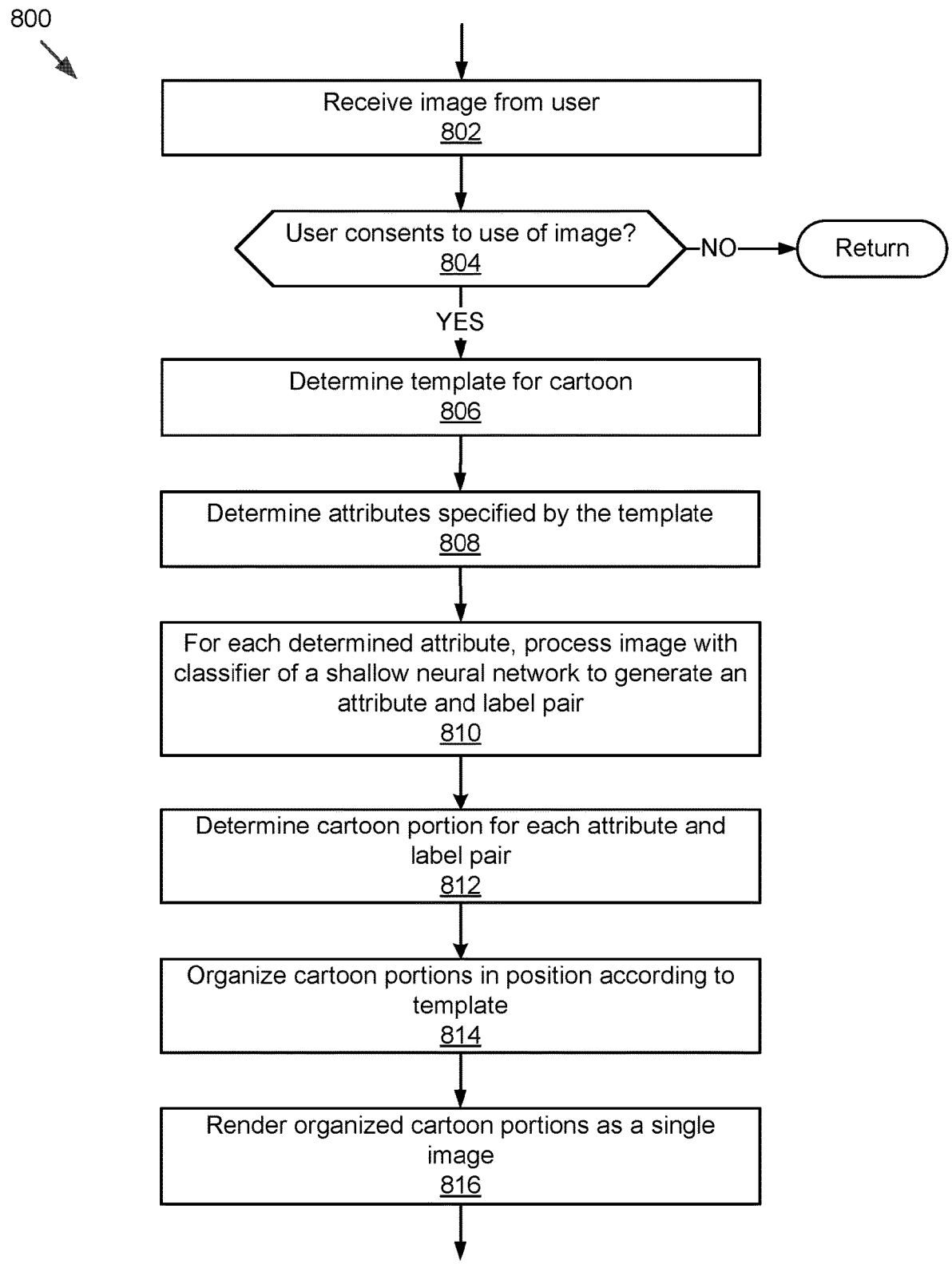
FIG. 8 is a flowchart illustrating a second example method for creating a cartoon using a classifier.

Referring now to FIG. 8, a second example method 800 for creating a cartoon using a one or more classifiers is described. The method 800 begins by receiving 802 an image from the user. The image may be provided by the computing device 106 to the cartoon generation module 116. Then the method 800 determines 604 whether the user has consented to use of her image that was input in block 802. If not, the method 800 returns and does not process the image. In some implementations, the method 800 returns to block 802 to receive another image. However, if the user has consented to use of her image that was input in block 802, the method 800 continues to block 806 and determines a template for the cartoon. The template defines the organization of the cartoon portions, specifies the attributes needed, and may include default cartoon portions that are used when rendering the cartoon if an attribute is missing or the cartoon portion for the attribute is missing. In some implementations, the template is defined by each cartoon style that is determined by an artist. This allows classifications determined for a particular selfie to be mapped on to many different templates without the need to make template-specific classifiers. Next, the method 800 determines 808 the attributes needed for the template. The attributes are specified by the template. For each attribute, there is a corresponding classifier that will need to process the image and generate one or more labels. Then the method 800 processes 810 the image with classifier 204 of a shallow neural network model 228 for each determined attribute in block 808 to generate an attribute and label pair. Next, the method 800 determines 812 the cartoon portion (or cartoon asset) corresponding to attribute and label pairs from block 810, and retrieves the cartoon asset corresponding to each attribute and label pair. This produces a group of cartoon assets that will be used to generate the ultimate image. Next, the method 800 organizes 814 the cartoon portions in positions relative to each other and adds other fixed elements of the cartoon specified by the template. Finally, the method 800 renders 816 the organized cartoon portions to produce a single image.

It should be recognized that in FIG. 1 as well as other figures used to illustrate the present disclosure, an indication of a letter after a reference number or numeral, for example, "106a" is a specific reference to the element or component that is designated by that particular reference numeral. In the event a reference numeral appears in the text without a letter following it, for example, "106," it should be recognized that such is a general reference to different implementations of the element or component bearing that general reference numeral.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some implementations, the network 102 may be a peer-to-peer network. The network 102 may also be coupled to or includes portions of a telecommunications network for sending data in a variety of different communication protocols. In some other implementations, the network 102 includes Bluetooth communication networks or a cellular communications network for sending and receiving data including via short messaging service (SMS), multimedia messaging service (MMS), hypertext transfer protocol (HTTP), direct data connection, wireless access protocol (WAP), email, etc. In addition, although FIG. 1 illustrates a single network 102 coupled to the computing devices 106 and the server 108 in practice one or more networks 102 may be connected to these entities.

The computing devices 106a through 106n in FIG. 1 are used by way of example. Although only two computing devices 106 are illustrated, the disclosure applies to a system architecture having any number of computing devices 106 available to any number of users 114. In the illustrated implementation, the users 114a through 114n interact with the computing device 106a and 106n, via signal lines 112a through 112n, respectively. The computing devices 106a through 106n are communicatively coupled to the network 102 via signal lines 104a through 104n respectively.

In some implementations, the computing device 106 (any or all of 106a through 106n) can be any computing device that includes a memory and a processor. For example, the computing device 106 can be a laptop computer, a desktop computer, a tablet computer, a mobile telephone, a smart phone, a personal digital assistant, a mobile email device, a portable game player, a portable music player, a television with one or more processors embedded therein or coupled thereto or any other electronic device capable of accessing the network 102, etc.

In some implementations, the computing devices 106a through 106n comprise a cartoon generation module 116 (illustrated as 116a through 116n) and other software, for example, an operating system and other applications. The user 114 (114a through 114n) uses the cartoon generation module 116 to generate cartoon images from photos of the user 114. The cartoon images can then in turn be used as emojis or stickers for use in other messaging applications or to exchange information with other components of the system 100, as appropriate to accomplish the operations of the present disclosure. For example, the cartoon images can be inserted directly into a conversation and not in-lined with the text in the conversation. In another example, the cartoon images can be still images or in animated or graphic formats. For purposes of this disclosure, the terms "cartoon," "cartoon images," "cartoon avatar," "cartoon icons," and "personalized emojis" are used interchangeably to mean the same thing, namely, a cartoon or animated version of the input face that captures coarse features or attributes of the user 114 as generated from the photo of the user 114. The operation of the cartoon generation module 116 will be described in more detail below with reference to FIG. 2. As one example, the user 114 may have several applications operational on the computing device 106 that receive and send messages about status and a variety of other conditions to and from other servers and the application server 108. For example, such applications may include social networking applications, messaging applications, photo sharing applications, video conferencing applications, etc.

The application server 108 may be a computing device that includes a processor, a memory and network communication capabilities. The application server 108 is coupled to the network 102 via a signal line 110. The application server 108 may be configured to include the cartoon generation module 116o and the classifier creation module 118 in some implementations. The application server 108 is a server for handling application operations and facilitating interoperation with back end systems. Although only a single application server 108 is shown, it should be understood that there could be any number of application servers 108 sending messages to the computing devices 106, creating and providing classifiers, and generating cartoons from photos. The application server 108 may communicate with the computing devices 106a through 106n via the network 102. The application server 108 may also be configured to receive status and other information from the computing devices 106a through 106n via the network 102.

As depicted in FIG. 1, the cartoon generation modules 116a, 116n are shown in dotted lines to indicate that the operations performed by the cartoon generation modules 116a, 116n as described herein can be performed at the computing device 106a, 106n, or the application server 108, or any combinations of the these components. Additional structure, acts, and/or functionality of the cartoon generation module 116 is described in further detail below with respect to at least FIG. 2. While the cartoon generation modules 116a, 116n are described below as cooperating with the application server 108 to create and send cartoon images and classifiers, it should be understood that in some implementations, the cartoon generation modules 116a, 116n could be a stand-alone application operable on the computing device 106a, 106n.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Reference in the specification to "some implementations" or "an implementation" means that a particular feature, structure, or characteristic described in connection with the implementation is included in at least some instances of the description. The appearances of the phrase "in some implementations" in various places in the specification are not necessarily all referring to the same implementation.

Some portions of the detailed description are presented in terms of processes and symbolic representations of operations on data bits within a computer memory. These symbolic descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a non-transitory computer readable storage media, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementations, an entirely software implementation or implementations containing both hardware and software elements. In some implementations, the specification is implemented in software, which includes but is not limited to firmware, resident software, microcode, etc.

Furthermore, the description can take the form of a computer program product accessible from a computer-usable or computer-readable media providing program code for use by or in connection with a computer or any instruction execution system. For the purposes of this description, a computer-usable or computer readable media can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the processes and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be implemented in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using one or more computing devices, an image of a user;
determining, using the one or more computing devices, a template for an avatar;
determining, based on the image of the user and using the one or more computing devices, attributes needed for the template, wherein the attributes include a plurality of facial attributes;
processing, using the one or more computing devices, the image with a respective classifier trained to generate a corresponding label that corresponds to a value of each of the attributes, wherein each classifier is coupled to a selected layer of a pre-trained neural network model and wherein the selected layer of the pre-trained neural network model is selected by determining that the selected layer provides discrimination for a corresponding attribute;
determining, using the one or more computing devices, a set of assets for the avatar based on labels; and
rendering, using the one or more computing devices, the avatar personifying the user using the set of assets by:
organizing each asset of the set of assets into a position relative to other assets corresponding to the plurality of facial attributes in the template; and
rendering the avatar based on the organized assets.

2. The computer-implemented method of claim 1, further comprising dividing the attributes into a primary attribute list and a secondary attribute list.

3. The computer-implemented method of claim 2, wherein determining the set of assets based on the labels is based on ranking candidate assets associated with each label based on a level of match between each candidate asset and the label, and using the candidate assets that meet a threshold rank.

4. The computer-implemented method of claim 1, wherein the set of assets are a first set of assets that correspond to a first style and are associated with a face parameterization and further comprising:
receiving a second set of assets that correspond to a second style or emotional expression;
determining whether the second style or emotional expression is compatible with the face parameterization; and
responsive to determining that the second style or the emotional expression is compatible with the face parameterization, determining a new set of assets for the second style or emotional expression.

5. The computer-implemented method of claim 4, wherein determining the new set of assets includes:
mapping the first set of assets to the second style or emotional expression; and
deriving the new set of assets based on the mapping.

6. The computer-implemented method of claim 1, wherein rendering the avatar further includes adding fixed elements that are specific to a style for the avatar.

7. The computer-implemented method of claim 1, further comprising:
presenting the avatar on a display of a user device;
receiving user input on the display that is a manual edit of the avatar; and
rerendering the avatar based on a changed face parameterization, wherein the changed face parameterization is based on the user input.

8. A computer program product comprising a non-transitory computer readable medium including a computer readable program, wherein the computer readable program when executed on a computer causes the computer to perform operations comprising:
receiving, using one or more computing devices, an image of a user;
determining, using the one or more computing devices, a template for an avatar;
determining, based on the image of the user and using the one or more computing devices, attributes needed for the template, wherein the attributes include a plurality of facial attributes;
processing, using the one or more computing devices, the image with a respective classifier trained to generate a corresponding label that corresponds to a value of each of the attributes, wherein each classifier is coupled to a selected layer of a pre-trained neural network model and wherein the selected layer of the pre-trained neural network model is selected by determining that the selected layer provides discrimination for a corresponding attribute;
determining, using the one or more computing devices, a set of assets for the avatar based on labels; and
rendering, using the one or more computing devices, the avatar personifying the user using the set of assets by:
organizing each asset of the set of assets into a position relative to other assets corresponding to the plurality of facial attributes in the template; and
rendering the avatar based on the organized assets.

9. The computer program product of claim 8, wherein the operations further comprise dividing the attributes into a primary attribute list and a secondary attribute list.

10. The computer program product of claim 9, wherein determining the set of assets based on the labels is based on ranking candidate assets associated with each label based on a level of match between each candidate asset and the label, and using the candidate assets that meet a threshold rank.

11. The computer program product of claim 8, wherein the set of assets are a first set of assets that correspond to a first style and are associated with a face parameterization and the operations further comprise:
receiving a second set of assets that correspond to a second style or emotional expression;
determining whether the second style or emotional expression is compatible with the face parameterization; and
responsive to determining that the second style or the emotional expression is compatible with the face parameterization, determining a new set of assets for the second style or emotional expression.

12. The computer program product of claim 11, wherein determining the new set of assets includes:
mapping the first set of assets to the second style or emotional expression; and
deriving the new set of assets based on the mapping.

13. The computer program product of claim 8, wherein rendering the avatar further includes adding fixed elements that are specific to a style for the avatar.

14. The computer program product of claim 8, wherein the operations further comprise:

presenting the avatar on a display of a user device;
receiving user input on the display that is a manual edit of the avatar; and
rerendering the avatar based on a changed face parameterization, wherein the changed face parameterization is based on the user input.

15. A system comprising:
a processor; and
a memory coupled to the processor and storing instructions that, when executed, cause the processor to perform operations comprising:
receiving, using one or more computing devices, an image of a user;
determining, using the one or more computing devices, a template for an avatar;
determining, based on the image of the user and using the one or more computing devices, attributes needed for the template, wherein the attributes include a plurality of facial attributes;
processing, using the one or more computing devices, the image with a respective classifier trained to generate a corresponding label that corresponds to a value of each of the attributes, wherein each classifier is coupled to a selected layer of a pre-trained neural network model and wherein the selected layer of the pre-trained neural network model is selected by determining that the selected layer provides discrimination for a corresponding attribute;
determining, using the one or more computing devices, a set of assets for the avatar based on labels; and
rendering, using the one or more computing devices, the avatar personifying the user using the set of assets by:
organizing each asset of the set of assets into a position relative to other assets corresponding to the plurality of facial attributes in the template; and
rendering the avatar based on the organized assets.

16. The system of claim 15, wherein the operations further comprise dividing the attributes into a primary attribute list and a secondary attribute list.

17. The system of claim 15, wherein the set of assets are a first set of assets that correspond to a first style and are associated with a face parameterization and the operations further comprise:
receiving a second set of assets that correspond to a second style or emotional expression;
determining whether the second style or emotional expression is compatible with the face parameterization; and
responsive to determining that the second style or the emotional expression is compatible with the face parameterization, determining a new set of assets for the second style or emotional expression.

18. The system of claim 17, wherein determining the new set of assets includes:
mapping the first set of assets to the second style or emotional expression; and
deriving the new set of assets based on the mapping.

19. The system of claim 18, wherein determining the set of assets based on the labels is based on ranking candidate assets associated with each label based on a level of match between each candidate asset and the label, and using the candidate assets that meet a threshold rank.

20. The system of claim 15, wherein rendering the avatar further includes adding fixed elements that are specific to a style for the avatar.

* * * * *